United States Patent
Park et al.

(10) Patent No.: US 11,302,965 B2
(45) Date of Patent: Apr. 12, 2022

(54) ELECTROLYTE INCLUDING LOW MOLECULAR WEIGHT ESTER AND NON-FLUORINATED CARBONATE FOR LOW TEMPERATURE OPERATION OF LITHIUM TITANATE AND GRAPHITE ELECTRODES, AND LITHIUM-ION BATTERIES

(71) Applicant: SAFT AMERICA, Cockeysville, MD (US)

(72) Inventors: Joong Sun Park, Baltimore, MD (US); Saori Tokuoka, Towson, MD (US); Carine Margez, Parkville, MD (US); Thomas Greszler, Phoenix, MD (US)

(73) Assignee: SAFT AMERICA, Cockeysville, MD (US)

( * ) Notice: Subject to any disclaimer, the term of this patent is extended or adjusted under 35 U.S.C. 154(b) by 105 days.

(21) Appl. No.: 16/270,160

(22) Filed: Feb. 7, 2019

(65) Prior Publication Data

US 2020/0259215 A1    Aug. 13, 2020

(51) Int. Cl.
    *H01M 10/0569*      (2010.01)
    *H01M 4/505*      (2010.01)
    (Continued)

(52) U.S. Cl.
    CPC ....... *H01M 10/0569* (2013.01); *H01M 4/505* (2013.01); *H01M 4/587* (2013.01);
    (Continued)

(58) Field of Classification Search
    CPC ......... H01M 10/0569; H01M 10/0525; H01M 10/0567; H01M 4/505; H01M 4/587; H01M 4/5825
    (Continued)

(56) References Cited

U.S. PATENT DOCUMENTS

| | | | |
|---|---|---|---|
| 6,692,874 B2 | 2/2004 | Kim et al. | |
| 2004/0023121 A1* | 2/2004 | Nakamura | H01B 1/122 429/317 |
| 2007/0287071 A1* | 12/2007 | Chiga | H01M 10/0569 429/332 |

(Continued)

FOREIGN PATENT DOCUMENTS

| | | |
|---|---|---|
| CN | 102544584 A | 7/2012 |
| CN | 104752768 A | 7/2015 |

(Continued)

OTHER PUBLICATIONS

Ding et al., Properties of PC-EA Solvent and Its Solution of LiBOB Comparision of Linear Esters to Linear Carbonates for Use in Lithium Batteries, May 2005, Journal of The Electrochemical Society, 152, A1199-A1207 (Year: 2005).*

(Continued)

*Primary Examiner* — Sean P Cullen
(74) *Attorney, Agent, or Firm* — Sughrue Mion, PLLC

(57) ABSTRACT

Provided are an electrolyte for low temperature operation of lithium titanate electrodes, graphite electrodes, and lithium-ion batteries as well as electrodes and batteries employing the same. The electrolyte contains 1 to 30 vol % of a low molecular weight ester having a molecular weight of less than 105 g/mol and at least one non-fluorinated carbonate. An electrolyte additive may include 0.1 to 10 wt % of fluorinated ethylene carbonate, particularly when used with a graphite anode. Another electrolyte contains a high content of the low molecular weight ester of at least 70 vol %.

12 Claims, 4 Drawing Sheets

(51) Int. Cl.
*H01M 4/58* (2010.01)
*H01M 4/587* (2010.01)
*H01M 10/0525* (2010.01)
*H01M 10/0567* (2010.01)

(52) U.S. Cl.
CPC ..... *H01M 4/5825* (2013.01); *H01M 10/0525* (2013.01); *H01M 10/0567* (2013.01); *H01M 2300/0042* (2013.01)

(58) Field of Classification Search
USPC .................................. 429/331, 231.1, 231.8
See application file for complete search history.

(56) References Cited

U.S. PATENT DOCUMENTS

| | | | | |
|---|---|---|---|---|
| 2010/0015524 A1* | 1/2010 | Kim | ...................... | H01M 4/133 429/207 |
| 2012/0164519 A1* | 6/2012 | Lee | ................... | H01M 10/0569 429/163 |
| 2013/0209895 A1* | 8/2013 | Kim | .................. | H01M 10/0568 429/332 |
| 2015/0221977 A1* | 8/2015 | Hallac | ................ | H01M 10/0568 429/163 |
| 2016/0118691 A1* | 4/2016 | Goh | .................. | H01M 10/0569 429/343 |
| 2017/0288271 A1* | 10/2017 | Le | ...................... | H01M 10/0568 |
| 2018/0277900 A1* | 9/2018 | Abe | ....................... | H01M 4/364 |
| 2018/0366771 A1* | 12/2018 | Deng | .................. | C01G 45/1242 |

FOREIGN PATENT DOCUMENTS

| | | | |
|---|---|---|---|
| CN | 107180993 A | | 9/2017 |
| CN | 107742745 A | * | 2/2018 |
| CN | 105811010 B | | 1/2019 |
| JP | 2009-123707 A | | 6/2009 |
| JP | 2013-225388 A | | 10/2013 |
| WO | WO-2017057588 A1 | * | 4/2017 ............ H01M 4/525 |
| WO | WO-2017120884 A1 | * | 7/2017 ............ H01M 4/505 |
| WO | WO-2017120887 A1 | * | 7/2017 ........ H01M 10/0525 |

OTHER PUBLICATIONS

Search Report dated May 26, 2020, from the European Patent Office in Application No. 20152051.

* cited by examiner

ELECTROLYTE INCLUDING LOW MOLECULAR WEIGHT ESTER AND NON-FLUORINATED CARBONATE FOR LOW TEMPERATURE OPERATION OF LITHIUM TITANATE AND GRAPHITE ELECTRODES, AND LITHIUM-ION BATTERIES

BACKGROUND

Technical Field

The present disclosure relates to an electrolyte for low temperature operation of lithium titanate electrodes, graphite electrodes, and lithium-ion batteries as well as electrodes and batteries employing the same.

Description of Related Art

In conventional Li ion battery electrolytes, in general, only a carbonate solvent is used. However, such an electrolyte is not suitable for use in a low temperature environment, such as −40° C. This is primarily because, at −40° C., the electrolyte becomes frozen or shows very low Li ion conductivity.

Low molecular weight esters, such as EA (Ethyl acetate), MP (methyl propionate), EP (ethyl propionate) and MB (methyl butyrate), have higher conductivity than carbonates at a low temperature. However, the high temperature stabilities of these low molecular weight esters are far worse than those of carbonates. As a result, at high temperatures, impedance growth and gassing may occur when using a low molecular weight ester.

U.S. Pat. No. 6,692,874 is directed to an electrolyte with improved performance at low temperatures. The electrolyte includes specific additives, namely, 4-carbomethoxymethyl 1,3-dioxan-2-one or 4-carboethoxymethyl 1,3-dioxan-2-one. The solvent candidates include esters and carbonates selected from ethylene carbonate (EC), propylene carbonate (PC), butylene carbonate (BC), vinylene carbonate (VC), diethylene carbonate (DEC), dimethylene carbonate (DMC), ethylmethylcarbonate (EMC), γ-butyrolactone, sulfolane, methyl acetate (MA), methyl propionate (MP), and methylformate (MF). However, the electrolyte of U.S. Pat. No. 6,692,874 is not disclosed as providing high temperature performance, for example, at a temperature 60° C.

CN104752768 is directed toward improving high temperature stability of a lithium titanate oxide (LTO) based cell by including various additives in the electrolyte. Namely, CN104752768 contemplates an electrolyte including 1.5-3.5% of dimethyl carbonate, 0.05-0.25% of ethylene carbonate, 0.15-0.35% of LiBOB, 0.1-0.45% of vinylene carbonate, 0.07-0.35% of crown ether, 0.04-0.06% of LiF, 0.05-0.065% of monofluoro ethylene carbonate, 0.05-0.25% of cyclohexylbenzene, 0.1-0.45% of dihydroxybiphenyl and 0.1-0.45% of 1,3-propane sultone. However, CN104752768 is silent regarding the low temperature performance of the cell.

CN102544584 is directed to improvement of high and low temperature performance of an LTO system by addition of a specific type of salt in the electrolyte. Specifically, CN102544584 teaches a non-aqueous electrolyte solution including a fluoride-containing sulfonimide lithium salt. However, the solvent in CN102544584 is simply a carbonate-based organic solvent and/or an ether organic solvent.

SUMMARY OF THE DISCLOSURE

The present disclosure has been accomplished in view of the above problems. The inventors unexpectedly discovered that a solvent comprising a non-fluorinated carbonate and 1 to 30 vol % of a low molecular weight ester based on the total volume of the solvent was able to achieve both very good performance at a low temperature, −40° C., and at high temperature, 60° C. Further, the present inventors found that adding fluorinated ethylene carbonate (FEC) in the solvent was able to provide a decrease in low temperature impedance, particularly when used with a graphite anode.

Furthermore, preferred embodiments of the present disclosure address the influence of salt composition and concentration on low temperature performance. That is, it has been previously understood that an electrolyte with high ionic conductivities shows better low temperature performances due to low resistance between two electrodes. However, high salt concentration electrolytes may face issues, such as increased aggregation negatively affecting transport properties as well as increased overpotential. Contrary to general belief, it was presently found that an electrolyte with a high salt concentration, within the solubility limit, demonstrated low overpotential during low temperature pulsing test. This illustrates that available lithium ions in the vicinity of electrode/electrolyte interface play a significant role at low temperature, and an electrolyte with a high salt concentration has enhanced charge transfer kinetics.

BRIEF DESCRIPTION OF THE FIGURES

Any figures contained herein are provided only by way of example and not by way of limitation.

DETAILED DESCRIPTION OF EMBODIMENTS OF THE DISCLOSURE

Figure 1:
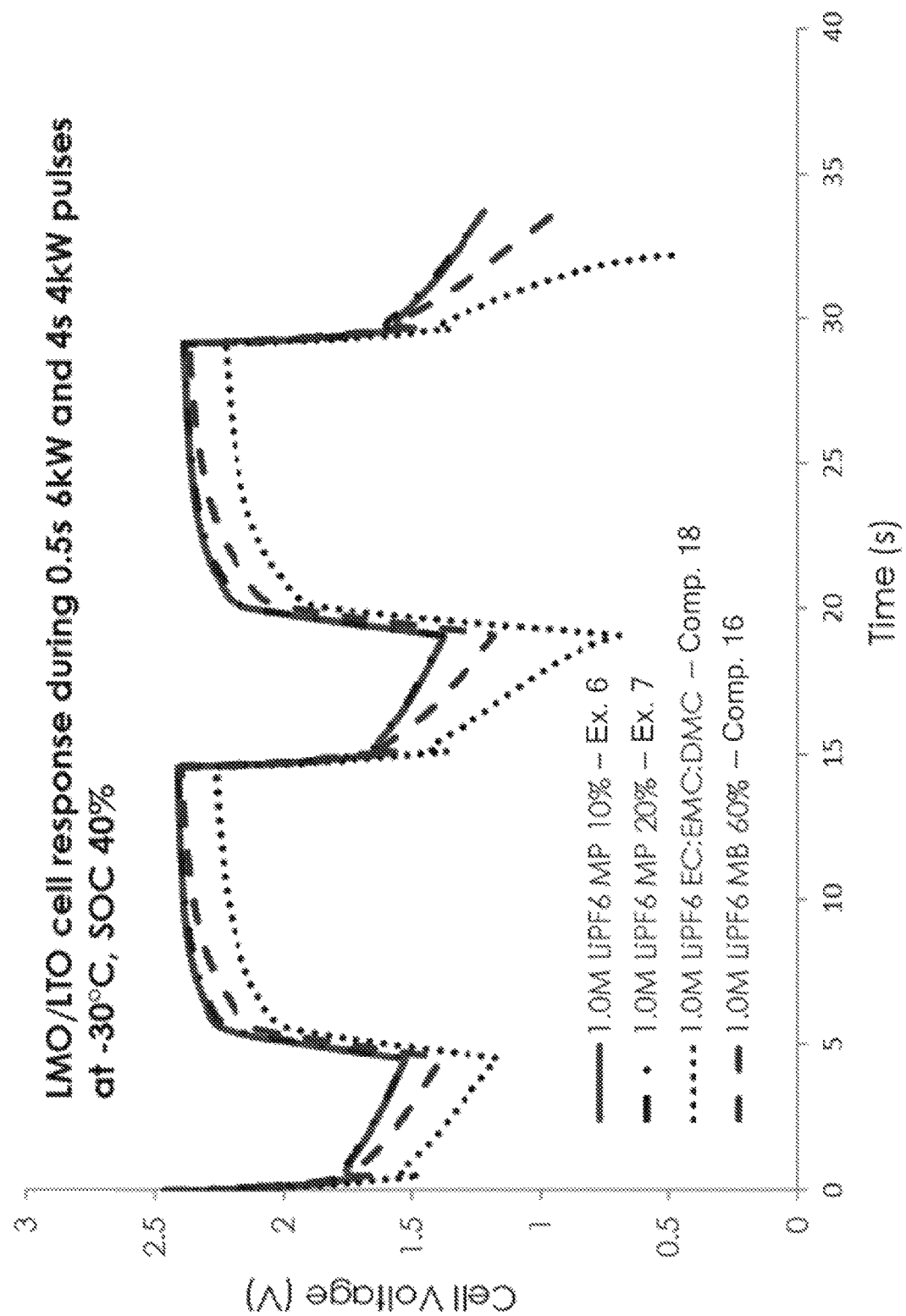
FIG. 1 is a graph showing cell response to pulses in Examples 6-9.

It is to be understood that both the foregoing general description and the following detailed description are exemplary and are intended to provide further explanation of the claims. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

According to the present disclosure, an electrolyte is provided comprising a non-fluorinated carbonate and at least one low molecular weight ester. The low molecular weight ester provides the solvent with very good conductivity at low temperatures, such as −40° C.

In preferred embodiments, the low molecular weight ester has a molecular weight of 105 g/mol or less. Preferred low molecular weight esters include ethyl acetate (EA), methyl propionate (MP), ethyl propionate (EP), and methyl butyrate (MB).

In preferred embodiments, the amount of low molecular weight ester in the solvent is 1 to 30 vol % based on the total volume of the solvent. In other embodiments, the amount of low molecular weight ester in the solvent is 3 to 28 vol %, 5 to 25 vol %, 7 to 23 vol %, 10 to 20 vol %, 12 to 18 vol %, 13 to 15 vol %, 15 to 17 vol %, 15 to 25 vol %, 18 to 25 vol %, 20 to 25 vol %, or 25 to 30 vol %. In a particularly preferred embodiment, the amount of low molecular weight ester in the solvent is 20 to 25 vol %.

The electrolyte of the present disclosure may include fluorinated ethylene carbonate (FEC) as an additive in the solvent. This is particularly indicated when a graphite anode is used. By adding FEC, it was found that low temperature impedance was reduced. This is believed to be due, at least in part, to a thin, desirable solid electrolyte interphase (SEI) formed on the anode, such as a graphite anode. Furthermore, it was found that when FEC is added, the performance under a −40° C. cold crank test can be significantly improved. The cold crank test (which is described in more detail below) relates to vehicle start up in extremely cold weather.

In preferred embodiments, the FEC can be added to the solvent in an amount of 0.1 to 10 wt % based on the total weight of the solvent. In other embodiments, the amount of FEC may be 1 to 10 wt %, 2 to 9 wt %, 3 to 8 wt %, 4 to 7 wt %, 5 to 6 wt %, 1 to 5 wt %, 1 to 4 wt %, 1 to 3 wt %, 1 to 2 wt %, 2 to 3 wt %, or 0.1 to 1 wt %. In a particularly preferred embodiment, the amount of FEC is from 2 to 3 wt %, and the amount of low molecular weight ester in the solvent is 20 to 25 vol %.

By employing the electrolyte of the present disclosure including the low molecular weight ester, Li-ion cells with lithium titanate or graphite anodes are able to achieve very good performance at −40° C. Further, the electrolyte of the present disclosure shows reasonable stability at 60° C.

In preferred embodiments, the electrolyte contains a high concentration of salt. Herein, a high concentration of salt refers to more than 1M. By increasing the salt concentration within the solubility limit, low temperature performance of the electrolyte can be improved. Unexpectedly, the present inventors found that an electrolyte with a high salt concentration, within the solubility limit, demonstrated low overpotential during low temperature pulsing test. This illustrates that available lithium ions in the vicinity of electrode/electrolyte interface play a significant role at low temperature, and an electrolyte with a high salt concentration has enhanced charge transfer kinetics.

In preferred embodiments, the salt concentration in the electrolyte is more than 1.0M, more than 1.2M, more than 1.4M, more than 1.5M, more than 1.6M, more than 1.7M, more than 1.8M, or more than 2.0M. In preferred embodiments, the salt concentration is less than 4.0M, less than 3.6M, less than 3.2M, less than 2.8M, less than 2.4M, less than 2.0M, less than 1.6M, or less than 1.2M.

The electrolyte salt is not particularly limited. In preferred embodiments, the electrolyte salt may comprise one or more of LiFSI (lithium bis(fluorosulfonyl)imide), LiTFSI (lithium bis(trifluoromethanesulfonyl)imide), $LiBF_4$, LiBOB (lithium bis(oxalato)borate), $LiClO_4$, $LiAsF_6$, $LiPF_6$, $LiCF_3SO_3$, LiTDI (lithium 4,5-dicyano-2-(trifluoromethyl)imidazole), and the like.

Provided by the present disclosure is also a Li-ion battery comprising an anode, a cathode, and the electrolyte of the present disclosure.

The active material of the cathode in the Li-ion battery is not particularly limited. In preferred embodiments, the Li-ion battery comprises a cathode having, as an active material, lithium manganese oxide (LMO), lithium nickel manganese oxide (LNMO), lithium nickel cobalt manganese oxide (NMC), lithium nickel cobalt aluminum oxide (NCA), lithium iron phosphate (LFP), lithium manganese iron phosphate (LMFP), or a blend of thereof.

As an anode active material of the Li-ion battery, graphite, lithium titanate oxide (LTO), Si, or a blend of thereof may be preferably used.

EXAMPLES

Examples 1-4 and Comparative Examples 1-18

Li-ion cells were assembled with positive electrodes (cathode) having the composition described in Paragraph No. [0086] of U.S. Patent Application Publication No. 2010/0320972 A1, and graphite negative electrodes (anode). The salt was 1.0 M $LiPF_6$. The solvent contained a non-fluorinated carbonate and an ester, and FEC was added to the solvent as additive. For these examples, the non-fluorinated carbonate was a mixture of EC/PC/EMC/DMC having a volume ratio 0.35/1.65/4/4. The amount of these components and the type of ester are shown in Table 1 below. Each of the assembled cells was subjected to a −40° C. crank test using 400 A 30 sec pulses at 100% state of charge (SOC). The minimum voltages during pulses at −40° C. are shown in Table 1.

Each of the cells was also subjected to a 60° C. cycling test. The capacity retention at 3000 cycles is shown in Table 1. In Table 1, Ethyl acetate (EA, molecular weight 88.11 g/mol), methyl propionate (MP, molecular weight 88.11 g/mol), ethyl propionate (EP, molecular weight 102.133 g/mol), and methyl butyrate (MB, molecular weight 102.133 g/mol) are low molecular weight esters, while ethyl butyrate (EB, molecular weight 116.16 g/mol), propyl butyrate (PB, molecular weight 130.19 g/mol), and butyl butyrate (BB, molecular weight 144.214 g/mol) are not considered low molecular weight esters in the present disclosure.

TABLE 1

|  |  | Solvent | | −40° C. Cold Crank Test Minimum Voltage (V) | | | | 60° C. Cycling Test Capacity Retention at 3000 cycles |
|---|---|---|---|---|---|---|---|---|
|  |  | Ester/Carbonate Mixture amount | Additive FEC (wt % based on weight of | | | | | |
|  | Ester | (vol %) | solvent) | Run 1 | Run 2 | Run 3 | Avg. | (%) |
| Comp. 1 | None | 0/100 | 10 | 1.01 | 1.11 | 0.90 | 1.01 | 85.4 |
| Ex. 1 | EA | 5/95 | 10 | 1.75 | 1.82 | 1.73 | 1.77 | 80.0 |
| Ex. 2 | MP | 5/95 | 10 | 1.75 | 1.82 | 1.72 | 1.76 | 85.2 |

TABLE 1-continued

| | Solvent | | Additive FEC (wt % based on weight of solvent) | −40° C. Cold Crank Test Minimum Voltage (V) | | | | 60° C. Cycling Test Capacity Retention at 3000 cycles |
|---|---|---|---|---|---|---|---|---|
| | Ester | Ester/ Carbonate Mixture amount (vol %) | | Run 1 | Run 2 | Run 3 | Avg. | (%) |
| Ex. 3 | EP | 5/95 | 10 | 1.66 | 1.72 | 1.61 | 1.67 | 85.4 |
| Ex. 4 | MB | 5/95 | 10 | 1.62 | 1.71 | 1.58 | 1.64 | 85.3 |
| Comp. 2 | EB | 5/95 | 10 | 1.41 | 1.51 | 1.37 | 1.43 | 85.4 |
| Comp. 3 | PB | 5/95 | 10 | 1.35 | 1.43 | 1.33 | 1.37 | 85.7 |
| Comp. 4 | BB | 5/95 | 10 | 1.12 | 1.20 | 1.08 | 1.13 | 85.7 |
| Comp. 5 | EA | 70/30 | 10 | 1.85 | 1.95 | 1.83 | 1.88 | 77.0 |
| Comp. 6 | EB | 70/30 | 10 | 1.50 | 1.56 | 1.43 | 1.50 | 81.1 |
| Comp. 7 | PB | 70/30 | 10 | 1.44 | 1.51 | 1.39 | 1.45 | 85.8 |
| Comp. 8 | BB | 70/30 | 10 | 1.32 | 1.38 | 1.27 | 1.32 | 85.9 |
| Comp. 9 | EA | 50/50 | 10 | 2.05 | 2.11 | 2.00 | 2.05 | 68.0 |
| Comp. 10 | MP | 50/50 | 10 | 2.04 | 2.11 | 1.99 | 2.05 | 72.3 |
| Comp. 11 | EP | 50/50 | 10 | 1.81 | 1.89 | 1.76 | 1.82 | 74.3 |
| Comp. 12 | MB | 50/50 | 10 | 1.79 | 1.83 | 1.74 | 1.79 | 76.2 |
| Comp. 13 | EB | 50/50 | 10 | 1.64 | 1.69 | 1.60 | 1.64 | 79.6 |
| Comp. 14 | PB | 50/50 | 10 | 1.57 | 1.62 | 1.51 | 1.57 | 85.9 |
| Comp. 15 | BB | 50/50 | 10 | 1.39 | 1.48 | 1.33 | 1.40 | 86.9 |

As seen in Table 1 above, Examples 1-4 were able to simultaneously obtain a good cold crank voltage of at least 1.64 V and a satisfactory capacity retention at 60° C. of greater than or equal to 80%. On the other hand, Comparative Examples 2-4, 6-8, 14 and 15, which did not include the low molecular weight ester, provided a poor cold crank voltage of 1.57 V or less, while Comparative Example 13 provided a capacity retention at 60° C. of 79.6%. Additionally, Comparative Examples 5 and 9-12, which included more than 30 vol % of low molecular weight ester, provided a poor capacity retention at 60° C. of 77.0% or less.

Examples 6 and 7 and Comparative Examples 16-18

Li-ion cells were assembled with positive electrodes (cathode) having lithium manganese oxide (LMO) (specifically, $LiMn_2O_4$) as the positive active material and negative electrodes (anode) having lithium titanate oxide (LTO) (specifically, $Li_4T_5O_{12}$) as the negative active material. The electrolyte compositions and their conductivity are shown in Table 2 below.

TABLE 2

| Example | Electrolyte Salt and Solvent | −30° C. Conductivity (mS/cm) |
|---|---|---|
| Comp. 16 | 1.0 M $LiPF_6$ Low temperature electrolyte: EC/EMC/MB (2/2/6) (vol. ratio) | 2.9 |
| Comp. 17 | 1.0 M $LiPF_6$ Carbonate electrolyte consisting of EC/PC/DMC/EMC (10/20/45/25) (vol. ratio) | 2.1 |
| Comp. 18 | 1.0 M $LiPF_6$ EC/EMC/DMC (1/1/1) (vol. ratio) | 1.75 |
| Ex. 6 | 1.0 M $LiPF_6$ 90% of EC/PC/DMC/EMC and 10% of MP: (0.35/1.65/3.5/3.5/1.0) (vol. ratio) | 2.95 |
| Ex. 7 | 1.0 M $LiPF_6$ 80% of EC/PC/DMC/EMC and 20% of MP: (0.35/1.65/3/3/2.0) (vol. ratio) | 3.18 |

A cold crank test was performed on the cells of Examples 6 and 7 and Comparative Examples 16 and 18. The cell voltages during pulses at −30° C. were measured, wherein the pulses comprised a 0.5 s 6 kW (scaled) pulse and a 4 s 4 kW (scaled) pulse repeated three times. The results are shown in FIG. 1.

As shown in FIG. 1, the low temperature power performance of the LMO/LTO cells was improved by using an electrolyte with higher conductivity. From Examples 6 and 7, the difference between including 10% of MP versus 20% MP in the formulation was shown to be insignificant. In Comparative Example 18, the electrolyte having only carbonates (EC:EMC:DMC (1:1:1), represented by dotted line in FIG. 1) showed substantial voltage drop. This was due to transport limitation. The electrolytes having 20% or less of low molecular weight ester showed better power performance than the electrolyte of Comparative Example 16 with 60% ester (EC/EMC/MB (2/2/6), represented by dashed line in FIG. 1).

Examples 8-10—Ester-Rich Electrolyte

For Examples 8-10, Li-ion cells were assembled using the same LMO/LTO electrodes described above for Examples 6 and 7. The electrolyte for Examples 8-10 was an ester-rich electrolyte that included a low molecular weight ester ethyl acetate (EA) and non-fluorinated carbonate ethylene carbonate (EC) in a volume ratio of 85/15. $LiPF_6$ was used as the salt in each of Examples 8-10 at the concentrations described below.

Figure 2:
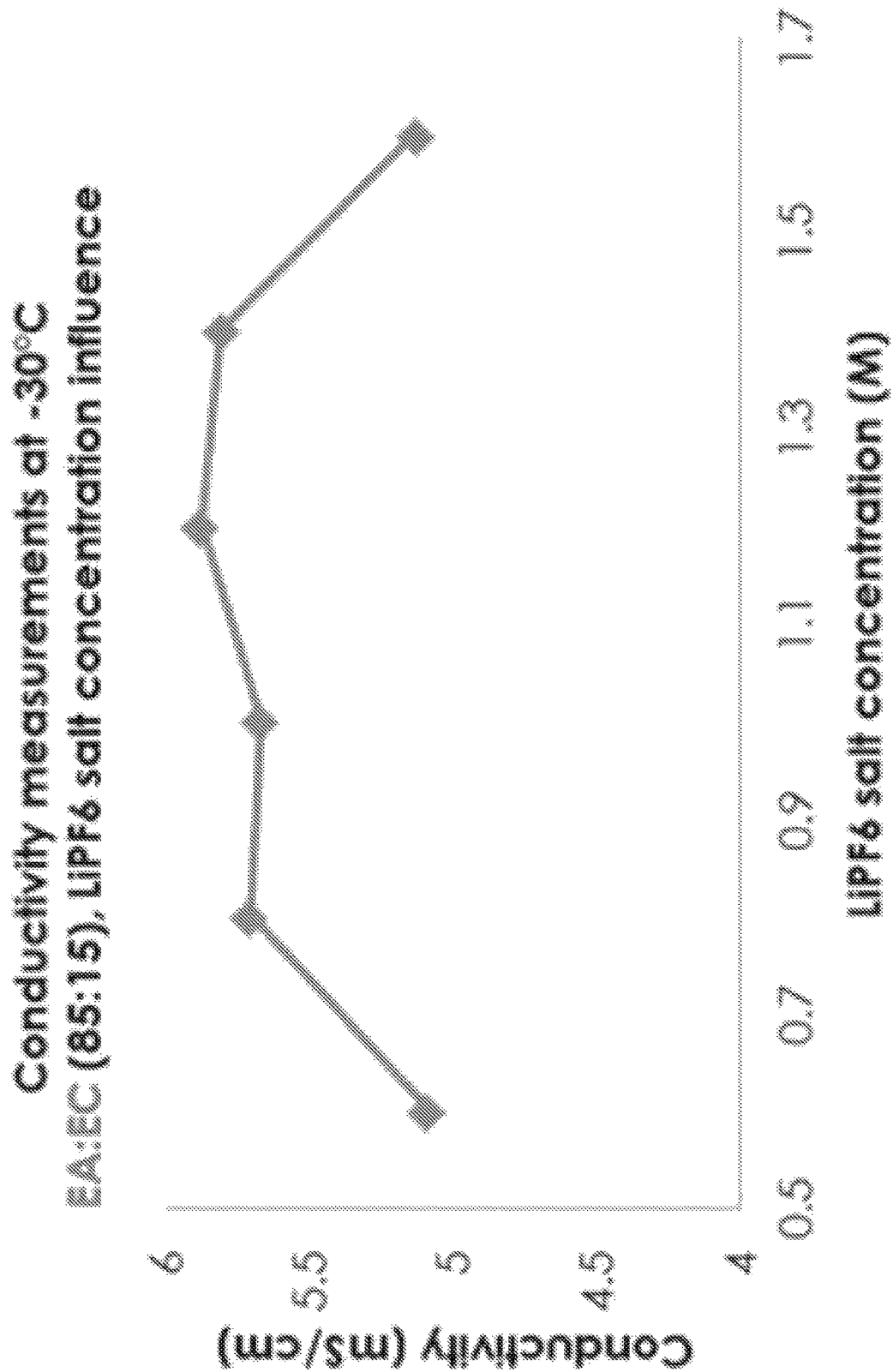
FIG. 2 is graph showing the relationship between salt concentration and conductivity from Example 10.

For Example 8, the concentration of LiPF$_6$ was varied, and the conductivity of the electrolyte at −30° C. was measured. The results are shown in FIG. 2. The observed results are well aligned with general behavior of non-aqueous electrolyte for lithium-ion batteries, wherein ion conductivity increases as number of free ions (salt concentration) increases until an optimal value (1.2M in this case). However, after the maximum, increase in salt concentration results in ion aggregation and higher viscosity of the solution, which in turn reduces both free ions and ionic mobility. As shown in FIG. 2, the conductivity of 1.6M salt concentration was 5.1 mS/cm, which is −15% lower than that of 1.2M salt concentration.

Figure 3:
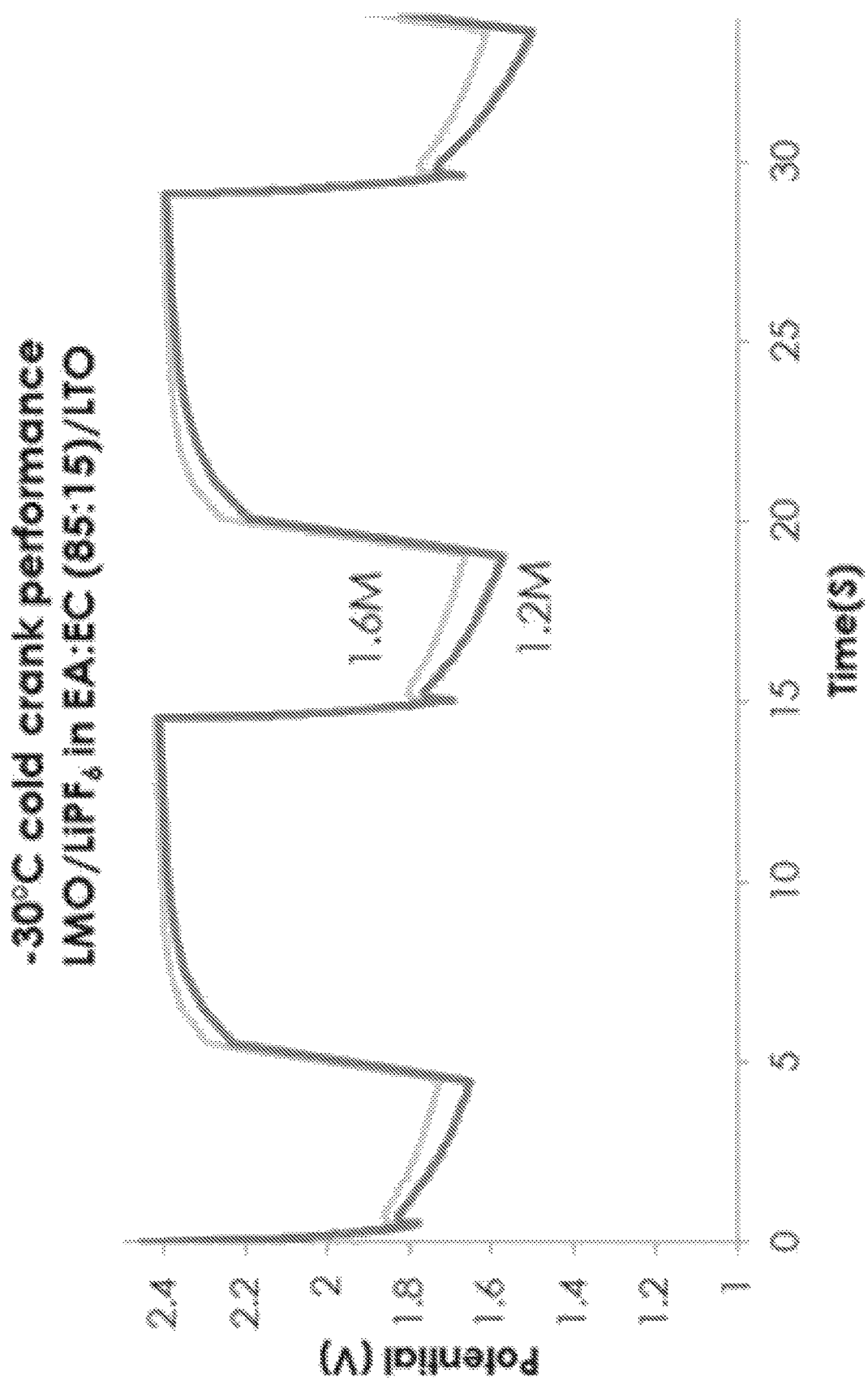
FIG. 3 is a graph showing cold crank performance results from Examples 11 and 12.

For examples 9 and 10, the concentration of LiPF$_6$ was 1.2M and 1.6M, respectively. These cells were subjected to a cold crank test as −30° C., and the results are shown in FIG. 3. As observed in FIG. 3, the cold crank performance at −30° C., surprisingly, improved with the higher salt concentration. This illustrates that ion conductivity is not the sole factor to determine low temperature performance. Instead, a charge-transfer process at the electrode/electrolyte interface is another factor to consider to enhance power performance at low temperature.

Examples 11 and 12—Carbonate-Rich Electrolyte

Figure 4:
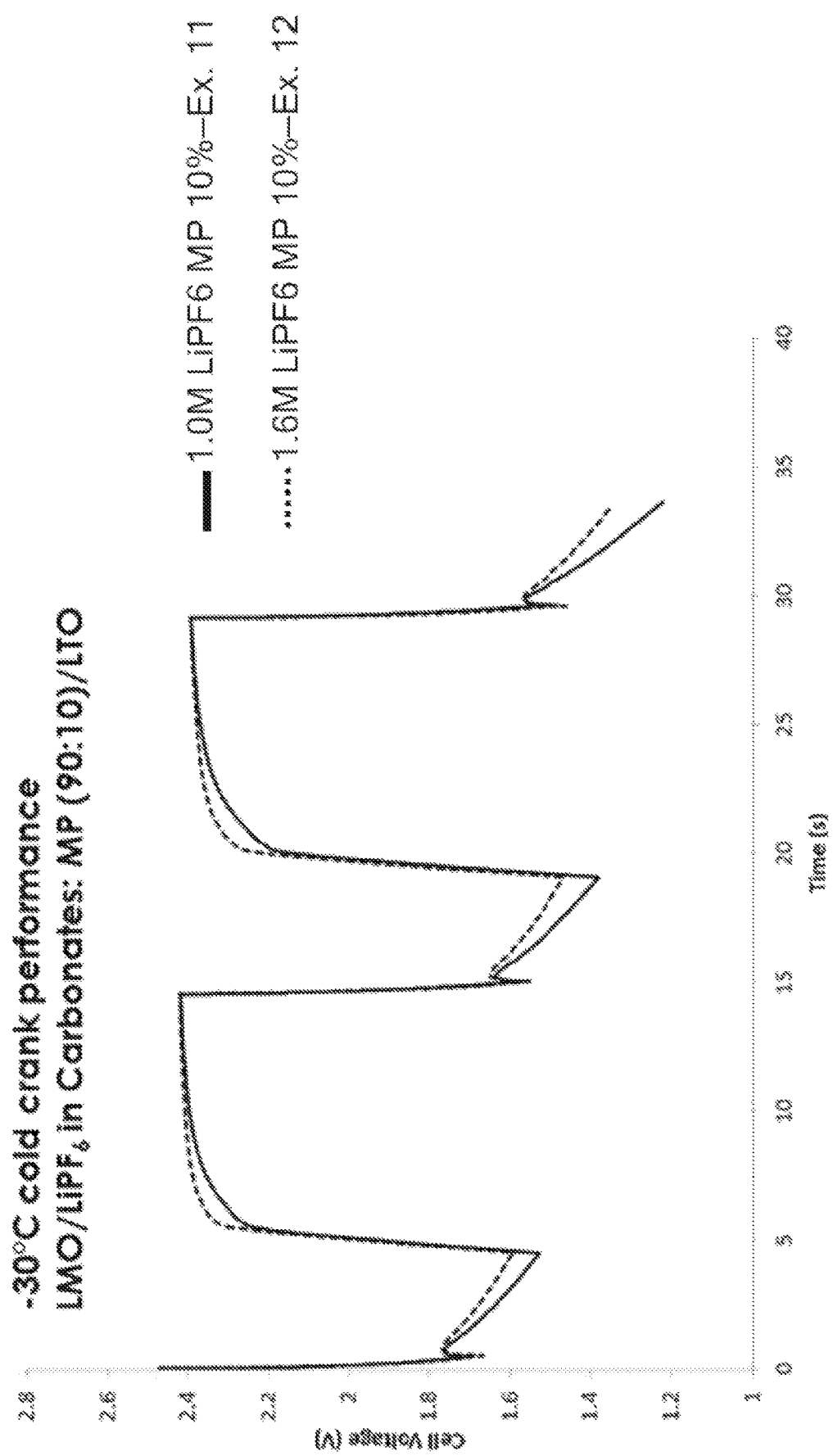
FIG. 4 is a graph showing cold crank performance results from Examples 13 and 14.

For Examples 11 and 12, Li-ion cells were assembled using the same LMO/LTO electrodes described above for Examples 6 and 7. The same electrolyte was used as in Example 6 (i.e., EC/PC/DMC/EMC/MP at a volume ratio of 0.35/1.65/3.5/3.5/1.0). The salt for Examples 11 and 12 was LiPF$_6$ in a concentration of 1.0M and 1.6M, respectively. The cells were subjected to a cold crank test performed at −30° C. The results are shown in FIG. 4. The carbonate-rich electrolyte of the present example provided similar results as the ester-rich electrolyte in FIG. 3. Again, the higher salt concentration exhibited better cold crank performances.

The disclosure is susceptible to various modifications and alternative means, and specific examples thereof have been shown by way of example in the drawings and are herein described in detail. It should be understood, however, that the disclosure is not to be limited to the particular devices or methods disclosed, but to the contrary, the disclosure is to cover all modifications, equivalents, and alternatives falling within the spirit and scope of the claims.

The invention claimed is:

1. A lithium-ion battery comprising an anode, a cathode, and an electrolyte,
   wherein the electrolyte comprises a solvent,
   wherein the solvent consists of:
      from more than 85 to 95 vol % of methyl butyrate based on a total volume of the solvent, and
      from less than 15 to 5 vol % of at least one non-fluorinated carbonate selected from the group consisting of ethylene carbonate (EC), propylene carbonate (PC), butylene carbonate (BC), vinylene carbonate (VC), diethylene carbonate (DEC), dimethylene carbonate (DMC), and ethylmethylcarbonate (EMC) based on the total volume of the solvent,
   wherein the electrolyte has a salt concentration of greater than 1.2 M and less than 4.0 M, and
   wherein the anode is a lithium titanate oxide.

2. The lithium-ion battery of claim 1, wherein the lithium titanate oxide is Li$_4$Ti$_5$O$_{12}$.

3. The lithium-ion battery of claim 1, wherein the electrolyte comprises LiPF$_6$.

4. The lithium-ion battery of claim 1, wherein the salt concentration is about 1.2 M to about 1.6 M.

5. The lithium-ion battery of claim 1, wherein the salt concentration is about 1.6 M.

6. The lithium-ion battery of claim 1, comprising, as a cathode active material, one or more compounds selected from the group consisting of lithium manganese oxide, lithium nickel manganese oxide, lithium nickel cobalt manganese oxide, lithium nickel cobalt aluminum oxide, lithium iron phosphate, and lithium manganese iron phosphate.

7. The lithium-ion battery of claim 6, wherein the cathode is a lithium manganese oxide.

8. The lithium-ion battery of claim 7, wherein the lithium manganese oxide is LiMn$_2$O$_4$.

9. The lithium-ion battery of claim 1, comprising, as a cathode active material, one or more compounds selected from the group consisting of lithium manganese oxide, lithium nickel manganese oxide, lithium nickel cobalt manganese oxide, lithium nickel cobalt aluminum oxide, lithium iron phosphate, and lithium manganese iron phosphate,
   wherein the lithium titanate oxide is Li$_4$Ti$_5$O$_{12}$, and
   wherein the electrolyte comprises LiPF$_6$.

10. The lithium-ion battery of claim 9, wherein the salt concentration is about 1.2 M to about 1.6 M.

11. The lithium-ion battery of claim 9, wherein the cathode active material is lithium manganese oxide is LiMn$_2$O$_4$.

12. The lithium-ion battery of claim 11, wherein the salt concentration is about 1.2 M to about 1.6 M.

* * * * *